United States Patent [19]

Reiff

[11] Patent Number: 5,247,522
[45] Date of Patent: Sep. 21, 1993

[54] FAULT TOLERANT BUS

[75] Inventor: Francis H. Reiff, Mannitou Springs, Colo.

[73] Assignee: Digital Equipment Corporation, Maynard, Mass.

[21] Appl. No.: 618,671

[22] Filed: Nov. 27, 1990

[51] Int. Cl.[5] .................................... G01R 31/28
[52] U.S. Cl. ............................ 371/29.5; 371/20.5; 371/68.1
[58] Field of Search ............... 371/20.5, 29.5, 20.4, 371/68.1; 370/14, 15, 16

[56] References Cited

U.S. PATENT DOCUMENTS

| | | | |
|---|---|---|---|
| 3,920,975 | 11/1975 | Bass | 371/20.5 |
| 4,622,669 | 11/1986 | Pri-Tal | 371/29.5 |
| 4,631,719 | 12/1986 | Huffman et al. | 370/20.5 |
| 4,847,838 | 7/1989 | Kralik | 371/29.5 |
| 4,958,347 | 9/1990 | White et al. | 371/29.5 |

*Primary Examiner*—Charles E. Atkinson
*Attorney, Agent, or Firm*—Arnold, White & Durkee

[57] ABSTRACT

A primary transceiver having a driver/receiver initially drives a bus while a secondary transceiver having a driver/receiver receives the signals present on the bus. The system compares the signals received by the secondary driver/receiver and the inputs to the primary driver/receiver. If a difference is detected, the system controller disables the primary driver/receiver and enables the secondary driver/receiver which drives the bus.

3 Claims, 3 Drawing Sheets

FAULT TOLERANT BUS

FIELD OF THE INVENTION

The present invention relates to error detection schemes for address and data buses, and more particularly to the method and apparatus for detecting the failure of such buses and preventing the loss of data which would normally be occasioned by such failure.

BACKGROUND OF THE INVENTION

The use of error detection schemes to detect bus failure is common throughout the electronic industry. Bus error detection techniques typically involve the use of error detection codes or parity bits to detect single bit errors in the data being sent over the bus. Since buses are generally reliable, the use of more elaborate error detection techniques is not common. Typically, the bus failure rate is used as a factor in determining the Mean Time Between Failure (MTBF) of the systems in which error detection techniques are incorporated rather than attempting to increase bus reliability. All known systems detect error or bus failure only after the address information or data has been transmitted and received. This after the fact detection of bus failure results in lost data and data recovery problems.

A fault tolerant bus which provides the address lines for a memory is particularly difficult to implement. In such a system, any address error correction procedures would have to be incorporated into the memory device itself in order to provide for the correction of errors which affect only one memory device. Such error detection schemes can include Hamming codes. Other prior art systems using error correction codes exist which can recover data when up to two random access memories (RAM) fail.

These prior art systems fail to detect certain types of addressing errors which can simultaneously affect more than two RAM arrays. The sources of these errors can include open circuited bus drivers and open circuits of the etch between the bus drivers and the memories.

SUMMARY OF THE INVENTION

In the preferred embodiment, the present invention recognizes and recovers from the failure of an address bus. These failures include open bus drivers and open circuits of the etch.

A primary transceiver including a driver and a receiver is located at one end of a bus and a redundant or secondary transceiver including a driver/receiver is connected to the termination of the bus. Initially, the driver of the primary transceiver drives the bus and the receiver of the secondary transceiver receives the signals transmitted by the primary transceiver. A logic circuit comprising a plurality of logic gates compares each line of the bus at the primary transceiver with the corresponding signal received by the receiver of the secondary transceiver.

If the data to each of the input lines of the primary transceiver does not correspond to the signal received by the secondary transceiver, thereby indicating a fault, one or more of the logic gates indicate the failure by outputting an indicating signal to the system controller whose use is well known to those of ordinary skill in the art. When this occurs, the system controller prevents the transfer of data. The system controller also initiates error recovery procedures which include the disabling of the drivers of the primary transceiver and enabling the drivers of the secondary transceiver. The drivers of the secondary transceiver now drive the bus. Data transfer resumes after the drivers of the secondary transceiver are enabled and the drivers of the primary transceiver are disabled. If the failure is due to an open condition of the primary transceiver, the bus resumes operation and data is recovered which otherwise would have been lost.

While the preferred embodiment of the invention is directed to address buses, the invention may also be used with data buses as well.

DESCRIPTION OF THE PREFERRED EMBODIMENT

Figure 1:
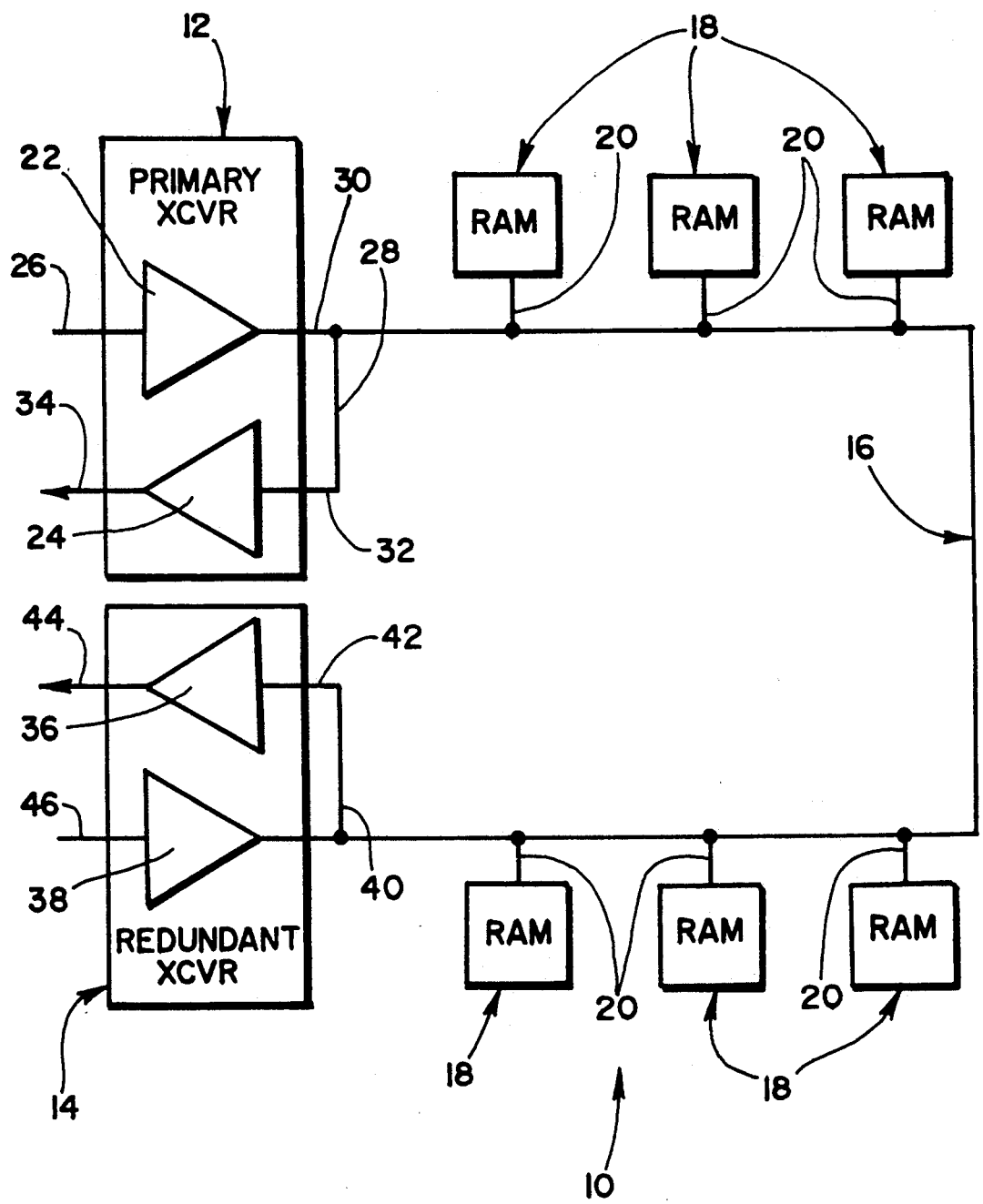
FIG. 1 is a block diagram of a fault tolerant bus which employs the present invention.

Referring now to the drawings, and more particularly to FIG. 1, one embodiment of the Fault Tolerant Bus 10 is shown. The fault tolerant bus 10 includes a primary transceiver (XCVR) 12, a secondary or redundant transceiver 14, and a bus 16 for sending data which can include address information. Connected to the bus 16 is a plurality of storage devices 18, which are shown here as random access memory (RAM) devices, although many other types of information storage devices can be used as would be understood by one skilled in the art. Each RAM is coupled to the bus by a link 20 whose configuration is established by the specific configuration of the bus 16 and the RAMs 18.

The bus 16 is a "single threaded" bus in which the bus has a single etch or "thread" connecting the primary transceiver 12 to each of the RAMs 18 and to the redundant transceiver 14. The single threaded bus contains a plurality of individual lines, the number of which depends on the application and the number of bits contained in the data sent over the bus 16. Each individual line of the bus 16 is, however, single threaded; each line connecting the primary transceiver 12 with the redundant transceiver 14. For purposes of illustration, the bus 16 is shown having a single line.

The primary transceiver 12 contains a primary driver 22 and a primary receiver 24. Typically, the primary driver 22 and the primary receiver 24 would be contained within an integrated circuit, although this is not necessary to practice the invention. In normal operation, the primary driver 22 drives the bus 16, which is connected to the plurality of RAMs 18 through the links 20. Initially, the data to be sent to the RAMs 18 is sent through the input line of the primary transceiver 26. This data is then sent to the RAMs 18 and to the primary receiver 24 through a line 28. The line 28 connects the output 30 of the primary driver 22 to the input 32 of the primary receiver 24. The primary receiver also includes an output line 34.

The data sent to the RAMs is also sent through the bus 16 to the redundant transceiver 14. The redundant transceiver 14 contains a redundant receiver 36 and a redundant driver 38. During the normal mode of operation, the data carried through the bus 16 is sent to the redundant receiver 36 through a line 40 to the input 42 of the redundant receiver 36. The redundant receiver includes an output 44.

In a primary mode of operation, the primary driver 22 receives data through the input 26. The data is sent over the bus 16 to each of the RAMs 18 and also to the redundant receiver 36. The primary receiver 24 also receives this same data through the line 28. The output 34 of the primary receiver 24 is coupled to logic circuitry (not shown) as is the output 44 of the redundant receiver 36. Both the primary receiver 24 and the redundant receiver 36 should, if every device and etch is operating properly, receive the same data that has been transmitted over the bus 16. The logic circuitry compares the content of data received by each receiver to determine if the information is the same. One way in which to compare this information is to use a plurality of exclusive-OR gates as would be understood by one skilled in the art.

The fault tolerant bus 10 compares the data received at input 26 and compares that data to the data transmitted through the bus 16 and received at the output 44. If the data appearing at the output 44 does not match the data at input 26, then a fault has occurred. Data that is driven by the primary driver 22 is received by the primary receiver 24 and sent to the output 34. The same data is sent through the bus 16 and received by the redundant receiver 36 and sent to the output 44. If the data appearing at the output 34 does not match the data appearing at output 44, then a fault has occurred somewhere between the input 26 of the primary driver 22 and the output 44 of the redundant receiver 36. Typical faults can occur at either the primary driver 22, at the redundant receiver 36, at a break in the etch at any point between the output 30 and the input 42, or at the redundant receiver 36.

If a fault is detected by the logic circuitry, the logic circuitry directs the fault tolerant bus 10 to operate in a redundant mode of operation. In the redundant mode, the redundant transceiver 14 operates to drive the bus 16 and the primary transceiver 12 operates to receive the information driven over the bus by the secondary driver 38. In this mode, data to be transmitted over the bus 16 is sent through an input 46 and driven by the driver 38 to the bus 16. The same information previously driven by the primary driver 22 is now driven by the redundant driver 38. As before, each of the RAMs receives the information previously transmitted. Because the most common failure is an open driver, the information which was to be transmitted can still be transmitted by the secondary transceiver.

The data is sent in this mode to the redundant receiver 36 through the output 44 to the logic circuit. This data is transmitted data. The data is also received by the primary receiver 24 after the data has travelled through the single threaded bus 16. This data is received data. The information which travelled through the bus is sent through the output 34 to the logic circuitry for comparison with the data at the output 44. If the transmitted information matches the received information, the location of the fault is likely in the primary driver 22. Because the most common failure mode for this type of bus is an open driver, the fault tolerant bus provides not only a way to preserve data, but can also help in locating the source of the fault.

Figure 2:
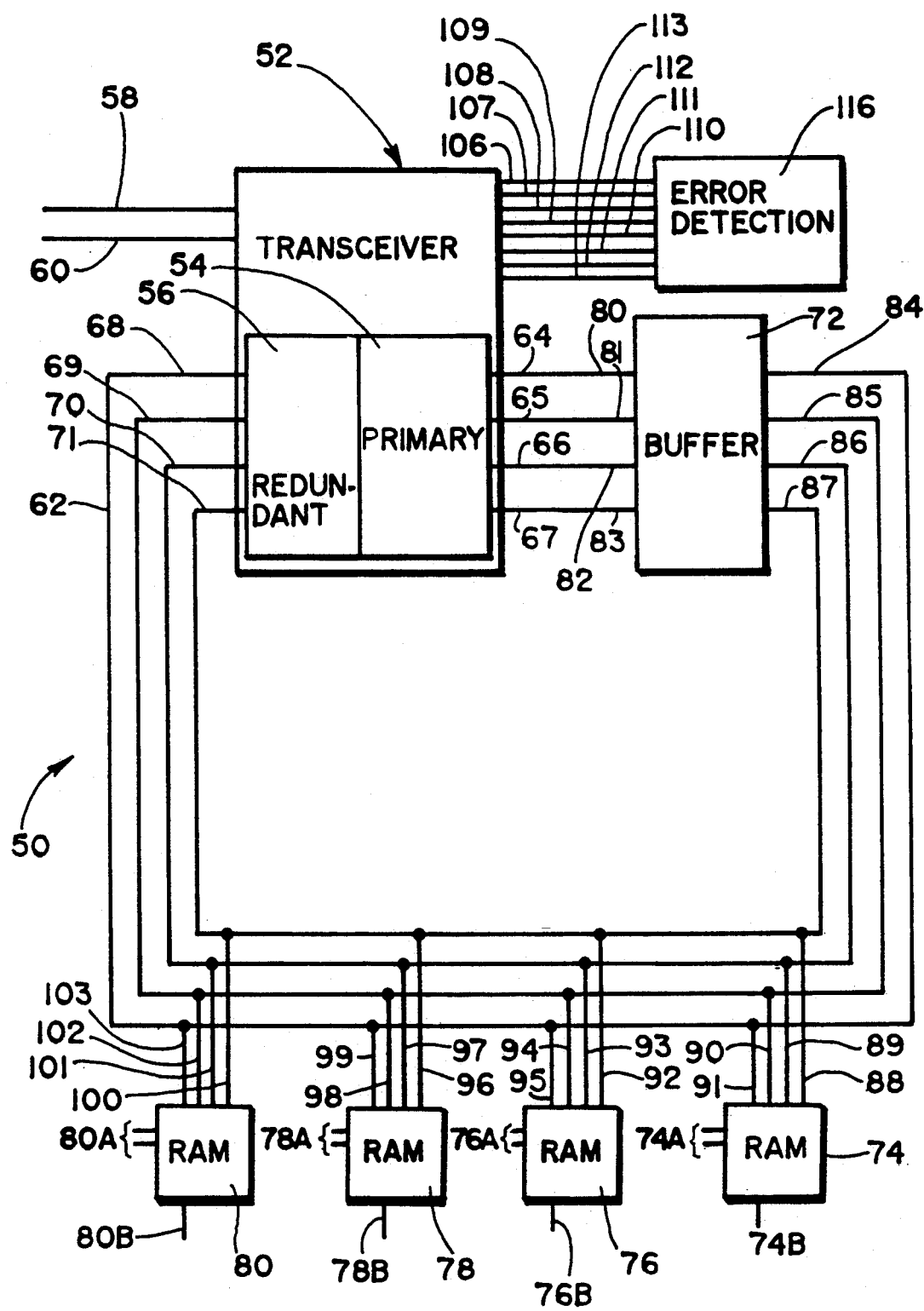
FIG. 2 is a block diagram illustrating a fault tolerant address bus.

FIG. 2 illustrates a block diagram of another embodiment of the present invention used for finding faults in an address bus. A fault tolerant address bus 50 includes a transceiver 52 comprising an integrated circuit. The transceiver 52 includes a primary circuit 54 and a redundant or secondary circuit 56. Both the primary circuit 54 and the redundant circuit 56 include a plurality of drivers and receivers for sending and receiving information as previously described in relation to FIG. 1. The transceiver 52 receives data through address data lines 58 and 60, the data indicating the address to be accessed.

An address bus 62 of this embodiment contains four lines for purposes of illustration. In most computer systems, the number of lines in an address bus is much greater. However, the principles of this invention can be applied to an address or a data bus of any size. The address bus 62 is coupled to the primary transceiver 54 and the secondary transceiver 56. As previously described the primary transceiver 54 and the secondary transceiver 56 act to send or to receive information over the address bus 62.

The primary transceiver includes four primary output/input lines 64, 65, 66, and 67. The secondary transceiver 56 also includes four secondary output/input lines 68, 69, 70, and 71.

Initially, the transceiver 52 sends addressing data over the primary output/input lines 64-67 as determined by the information received over the address data lines 58 and 60. The drivers in the primary transceiver 54 send the data information through a buffer 72. The buffer 72 is a bi-directional buffer which can transmit data in either direction. Because the buses are heavily loaded in some cases, the buffer 72 speeds up the transmission of data on the bus, thereby improving overall computing speed.

The buffer 72 is placed between the primary transceiver 54 and a plurality of four RAMs 74, 76, 78 and 80. Each of the RAMs is coupled to the address bus 62. The number of RAMs will vary depending upon the particular application. The buffer 72 includes four lines 80, 81, 82, and 83 for connecting to the primary transceiver 54. Four additional lines 84, 85, 86, and 87 connect the buffer to each line of the address bus 62, to each of the individual RAMs and to the secondary output/input lines 68-71 of the redundant transceiver 56. The address bus 62 described here is a single threaded bus from the primary transceiver 54 to the secondary transceiver 56.

Each RAM includes four address lines which are coupled to the address bus 62 for receiving address information from the transceiver. RAM 74 includes address lines 88, 89, 90, and 91; RAM 76 includes address lines 92, 93, 94, and 95; RAM 78 includes address lines 96, 97, 98, and 99; and RAM 80 includes address lines 100, 101, 102, and 103. Each RAM also includes control lines and data input lines. The number of control lines and the number of data lines varies with the application and the RAM chosen. The data lines are designated with the RAM number followed by the letter A and the control lines are designated with the RAM number followed by the letter B.

The fault tolerant address bus 50 connects to RAMs which can be RAM arrays which are readily available through a number of vendors. The system works equally well with all types of RAM arrays.

In the primary addressing mode, the primary transceiver 54 sends addressing information through the single threaded address bus 62 to each of the individual RAMs. Here, as in the embodiment of FIG. 1, the primary transceiver 54 includes drivers to send address data to the RAMs and receivers to receive address information from either the driver of the primary transceiver 54 or from the bus for sending to error detection circuitry. The transceiver 52 includes error detection lines 106 through 113 for sending the content of the individual lines of the address bus 62 to an error detection circuit 116.

The address data is received by the receivers of the redundant receiver 56 through the lines 68-71. If properly transmitted, this address information should match the address information sent by the drivers of the primary transceiver 54. The addressing information from both locations is sent through internal circuitry of the transceiver 52 to the lines 106 through 113 for delivery to the error detection circuitry 116. The error detection circuit 116 compares the content of the individual address bus lines as sent by the primary transceiver 54 and as received by the redundant transceiver 56 while in the primary transmitting mode. The error detection circuitry can either reside outside the transceiver 52, as depicted here, or can reside within the transceiver 52.

If the error detection circuit 116 detects an error, the transceiver 52 begins operating in a redundant addressing mode. To access the proper address at the RAMs, the redundant transceiver 56 is used to drive the bus 62 through lines 68 through 71. At the same time, the receivers of the redundant transceiver 56 send address data to the lines 106 through 113. The receivers of the primary transceiver 54, receive address data which has traveled the entire length of the address bus 62. The receivers of the primary transceiver 54 send the address data through the lines 106 through 113 for comparison in the error detection circuitry 116 with information received from the receivers of the redundant transceiver 56.

When the redundant transceiver 56 begins driving the bus 62 in the redundant mode, the addressing information travels more slowly along the bus than in the primary mode because there is not a buffer to aid in driving the bus 62 as before. A buffer could, however, be added and positioned in close proximity to the redundant transceiver to improve transmission speed.

Addressing errors create problems during both read and write cycles of information to and from the RAMs. Incorrect addressing during a read cycle causes the wrong information to be accessed. Incorrect addressing during a write cycle causes two problems. Not only is data stored at the wrong location, but any data contained at that location would be written over by the new data and consequently destroyed. The fault tolerant address bus, by recognizing addressing errors before read or write operations are completed, solves the problems of lost or misplaced data.

Figure 3:
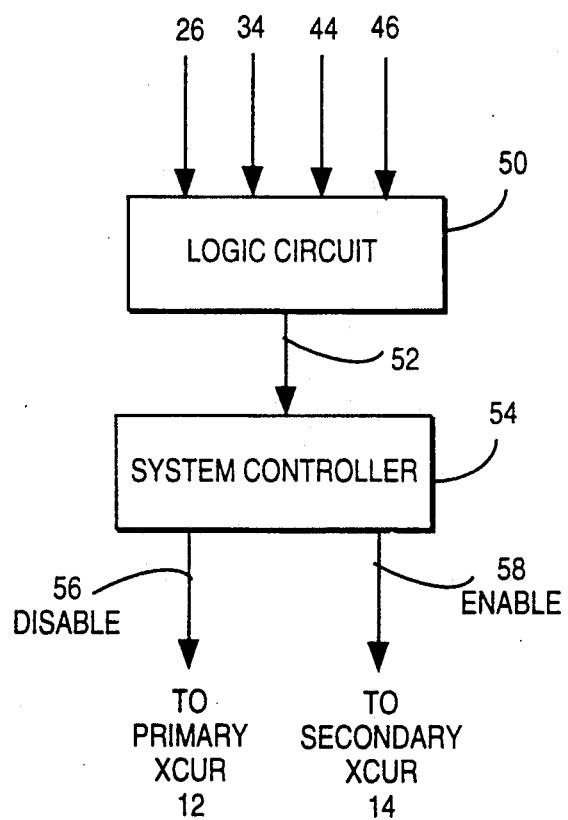
FIG. 3 is a block diagram illustrating the comparison of data in accord with the present invention.

FIG. 3 is a block diagram illustrating the comparison of data as described above. The input data on line 26, the data on output line 34 of the first transceiver 12, the data on output line 44 of the second transceiver 14 and the data on line 46 are applied to the logic circuit 50. The logic circuit 50 comprises a plurality of logic-gates, (e.g., exclusive-or gates) as would be understood by one of ordinary skill in the art. If the comparison of the data as described above indicates a difference then an indicating signal on line 52 is sent to the system controller 54. The system controller 54, the use of which is well-known to those of ordinary skill in the art, sends a signal on line 56 to disable the driver of the primary transceiver 12 and a signal on line 58 to enable the driver of the secondary transceiver 14 as is well-known to those of ordinary skill in the field.

The foregoing description of the invention has been presented for purposes of illustration and description. It is not intended to limit the invention to the precise forms disclosed, and many modifications and variations are possible in light of the above teachings. Those skilled in the art to which the invention pertains may make modifications and other embodiments employing the principles of the invention, particularly upon considering the foregoing teachings.

What is claimed is:

1. A method for detecting and recovering from the failure occuring during normal operation of a single-threaded communication bus having a primary line driver/receiver connected at one end of said bus, a secondary line driver/receiver connected at another end of said bus and a plurality of storage devices connected to said bus between said primary line driver/receiver and said secondary line driver/receiver, said method comprising the steps of:

supplying input data to said primary line driver/receiver;

driving said data onto said bus with said primary line driver/receiver;

detecting said data on said bus with said secondary line driver/receiver comparing said input data with said data detected by said secondary line driver/receiver; and disabling the driver of said primary line driver/receiver and driving data onto said bus with said secondary line driver/receiver if said comparison indicates a difference.

2. The method as set forth in claim 1, further comprising:

detecting said data on said bus with said primary line driver/receiver;

comparing said data detected by said primary line driver/receiver with said data detected by said secondary line driver/receiver; and disabling said primary line driver/receiver and driving data onto said bus with said secondary line driver/receiver if said comparison indicates a difference.

3. A fault tolerant single threaded bus for detecting and recovering from an open failure occuring during normal operation, comprising:

a primary line driver/receiver connected to one end of said bus for receiving input data and driving said data onto said bus;

a secondary line driver/receiver connected to another end of said bus for monitoring said data on said bus;

a plurality of storage means connected to said bus between said primary line driver/receiver and said secondary line driver/receiver; and comparitor means for comparing said input data with said data monitored by said secondary line driver/receiver and if a mismatch occurs generating a first output signal to disable the driver of said primary line driver/receiver and a second output signal to enable said secondary line driver/receiver to drive data onto said bus.

* * * * *